United States Patent
Vihtari

(10) Patent No.: US 8,612,365 B2
(45) Date of Patent: Dec. 17, 2013

(54) PCRN INCOMPLETE MESSAGE NOTIFICATION PROCESSING

(75) Inventor: Mike Vihtari, Kanata (CA)

(73) Assignee: Alcatel Lucent, Paris (FR)

(*) Notice: Subject to any disclaimer, the term of this patent is extended or adjusted under 35 U.S.C. 154(b) by 477 days.

(21) Appl. No.: 12/775,165

(22) Filed: May 6, 2010

(65) Prior Publication Data
US 2011/0276529 A1 Nov. 10, 2011

(51) Int. Cl.
*G06F 15/18* (2006.01)

(52) U.S. Cl.
USPC .......................................................... 706/12

(58) Field of Classification Search
USPC ................................................ 706/12; 726/1
See application file for complete search history.

(56) References Cited

U.S. PATENT DOCUMENTS

| | | | |
|---|---|---|---|
| 2008/0271113 A1* | 10/2008 | Belling | 726/1 |
| 2011/0050456 A1* | 3/2011 | Cornwall et al. | 340/870.02 |
| 2012/0033581 A1* | 2/2012 | Torres Ramon et al. | 370/253 |

OTHER PUBLICATIONS

N. Friedman, "Learning belief networks in the presence of missing values and hidden variables", Mach. Learning, Int'l Workshop and Conf. on, 1997, pp. 125-133.*
N.G. Duffield et al., "Multicast-Based Loss Inference With Missing Data", IEEE J. on Selected Areas in Communication, vol. 20, No. 4, May 2002, pp. 700-713.*

* cited by examiner

*Primary Examiner* — Kakali Chaki
*Assistant Examiner* — Vincent Gonzales
(74) *Attorney, Agent, or Firm* — Kramer & Amado PC

(57) ABSTRACT

Various exemplary embodiments relate to a method and related network node and machine-readable storage medium including one or more of the following: receiving a message at the PCRN, the message comprising at least one content element; inferring a message type of the message based on the at least one content element; and responding to the message based on the message type of the message and the at least one content element of the message. Inferring a message type may include applying a set of inference rules to content elements of the message to determine a message type. Various exemplary embodiments further include validating a message received at the PCRN, receiving an incomplete message at the PCRN, and inferring a value of a missing element of an incomplete message. Incomplete messages may include messages where the missing element is a message type element that indicates the type of the message.

18 Claims, 4 Drawing Sheets

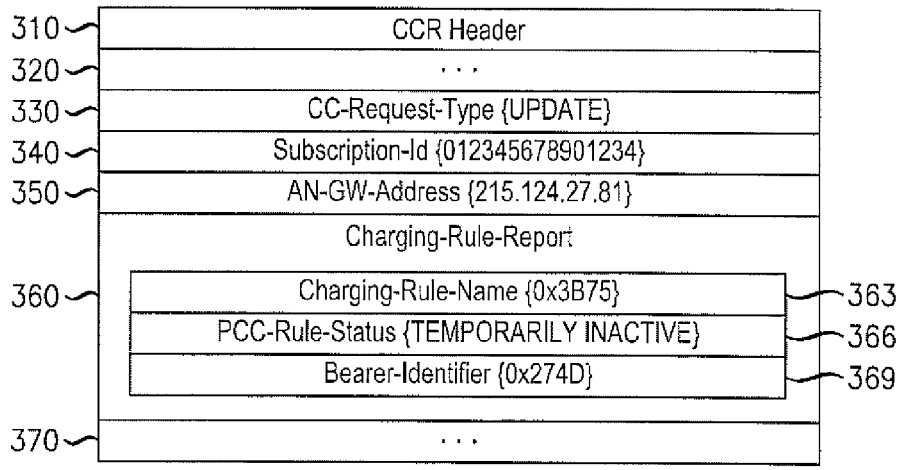

FIG. 3

| | Rule ID | Criteria | Result |
|---|---|---|---|
| 420 | 1 | Message contains 3GPP-SGSN-Address AVP or 3GPP-SGSN-IPv6-Address AVP | Message Type = SGSN_CHANGE |
| 425 | 2 | Message contains Final-Unit-Indication AVP | Message Type = OUT_OF_CREDIT |
| 430 | 3 | Message contains Charging-Rules-Report AVP and Event Storage contains OUT_OF_CREDIT event for indicated PCC Rule. | Message Type = REALLOCATION_OF_CREDIT |
| 435 | 4 | PCC-Rule-Status AVP = TEMPORARILY_INACTIVE | Message Type = LOSS_OF_BEARER |
| 440 | 5 | PCC-Rule-Status AVP = ACTIVE | Message Type = RECOVERY_OF_BEARER |
| 445 | ... | ... | ... |
| 450 | 99 | NONE | Message is invalid |

FIG. 4

PCRN INCOMPLETE MESSAGE NOTIFICATION PROCESSING

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other services are transmitted via the Internet Protocol (IP) and directed to a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it calls Long Term Evolution (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212 provides guidance on the format of messages passed between the various components. 3GPP TS 29.212 specifies that the EPC components will communicate using the Diameter Protocol and Attribute Value Pairs (AVPs). 3GPP TS 29.212 also specifies that the PCEF or BBERF may report events affecting network communication to the PCRF. It specifies how and when the PCEF or BBERF should report these events. 3GPP TS 29.212 also specifies the format for reporting other events such as termination of IP-CAN sessions and bearers.

The specifications allow a great deal of flexibility in reporting events. For example, 3GPP TS 29.212 allows the PCRF to set event triggers to indicate which events the other components should report. Additionally, the Diameter Protocol allows event messages to contain multiple AVPs without a specific order. This degree of flexibility however creates problems of interoperability as component manufacturers implement the specification differently. Moreover, implementations have changed over time and legacy systems may use different message formats.

In view of the foregoing, it would be desirable to provide a more flexible method of message handling at the PCRF. In particular, it would be desirable to provide a method for handling messages that increases interoperability and decreases message volume.

SUMMARY

In light of the present need for a more flexible method of message handling at the PCRF, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node and machine-readable storage medium including one or more of the following: receiving a message at the PCRN, the message comprising at least one content element; inferring a message type of the message based on the at least one content element; and responding to the message based on the message type of the message and the at least one content element of the message. Inferring a message type may include applying a set of inference rules to content elements of the message to determine a message type. Various exemplary embodiments further include validating a message received at the PCRN, receiving an incomplete message at the PCRN, and inferring a value of a missing element of an incomplete message. Incomplete messages may include messages where the missing element is a message type element that indicates the type of the message.

It should be apparent that, in this manner, various exemplary embodiments enable a PCRN to respond to a variety of messages. In particular, by inferring a message type from the information regarding the content elements of the message, a PCRN is able to respond to an incomplete message that is missing a message type element.

BRIEF DESCRIPTION OF THE DRAWINGS

In order to better understand various exemplary embodiments, reference is made to the accompanying drawings, wherein:

FIG. 3 illustrates an exemplary event reporting message;

FIG. 4 illustrates an exemplary data arrangement for storing inference rules.

DETAILED DESCRIPTION

Figure 1:
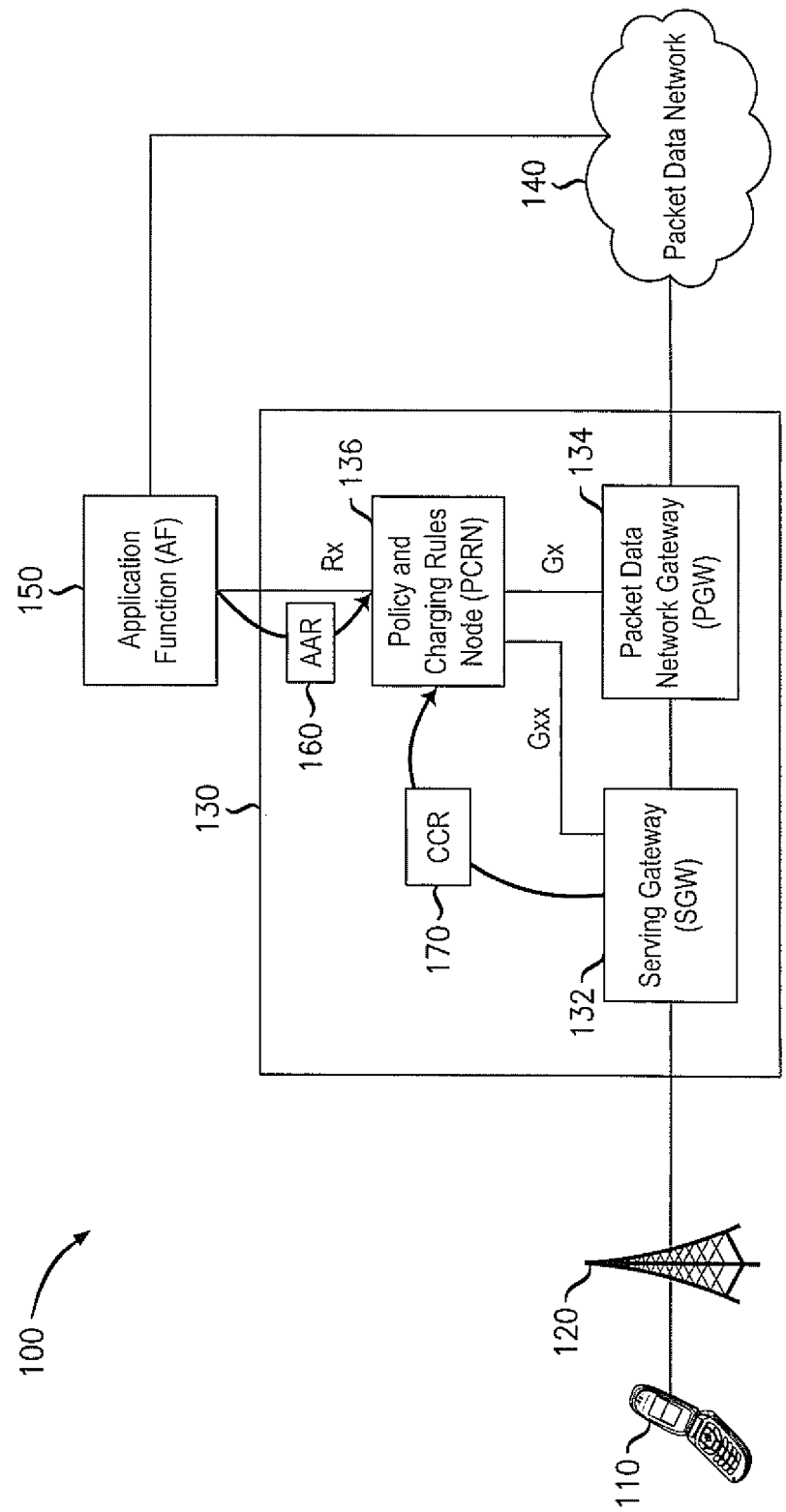
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary network may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, and a policy and charging rules node (PCRN).

Serving gateway (SGW) 132 may be a device that manages data paths between the base station 120 and PGW 134. The data paths may contain virtual containers called bearers with unique Quality of Service (QoS) characteristics. The bearers may contain virtual connections called service data flows (SDFs). In various embodiments where user equipment 110 is a mobile device and base station 120 is an eNodeB, SOW 132 may be responsible for establishing new bearers when the mobile device changes eNodeB. The SGW 132 may implement a bearer binding and event reporting function (BBERF) according to the 3GPP TS 29.212, 29.213, and 29.214 standards. In various embodiments, EPC 130 may include multiple serving gateways.

The SGW 132 may also provide event messages to the PCRN 136 via the Gxx interface in the form of a credit control request (CCR) message 170. SOW 132 may generate event messages to inform the PCRN 136 whenever there is a change in a bearer such as, for example, failure to allocate a bearer, termination of a bearer, preemption of a bearer or any other event for which an event trigger has been set. In various embodiments including multiple SGWs, each serving gateway may construct event messages differently. For example, one SGW may send an event message with an Event-Trigger AVP and the relevant content elements, while another SGW may send only the relevant content elements.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may request new PCC rules from PCRN 136 by sending a CCR message via the Gx interface. PGW 134 may also include a number of additional features such as, for example, packet filtering, deep packet inspection, and subscriber charging support.

The PGW 134 may also provide event messages to the PCRN via the Gx interface in the form of CCR messages (not shown). PGW 134 may construct event messages using the same format as SGW 132 or a different format than SGW 132. For example, PGW 134 may send an event message with an Event-Trigger AVP and the relevant content elements, whereas SGW 132 may send only the relevant content elements or vice versa. PGW 134 may also arrange content elements of messages in a different order than SGW 132.

Policy and charging rules node (PCRN) 136 may be a device that receives requests for application services, generates PCC rules, and provides PCC rules to the PGW 134 and/or other PCENs (not shown). PCRN 136 may be in communication with AF 150 via an Rx interface. PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the Proxy Mobile IP (PMIP) standard for example, PCRN 136 may also generate QoS rules. Upon creating a new QoS rule or upon request by the SGW 132, PCRN 136 may provide a QoS rule to SGW 132 via the Gxx interface.

PCRN 136 may receive event messages from SGW 132 or PGW 134. Event messages sent from SGW 132 and those sent from PGW 134 may have different formats. Event messages may contain message type elements and/or content elements. Message type elements may indicate the type of the message, but may not provide specific content information. Content elements may indicate a change in the network. As will be described in further detail below in connection with FIG. 3, some messages may be incomplete messages where some message elements are missing elements. For example, SGW 132 may send an event message without a message type element, making the message type element a missing element. SGW 132 and PGW 134 may also send other types of messages which do not relate to particular events. PCRN 136 may also receive messages which are the same type, but are formatted differently. PCRN 136 may interpret each message by analyzing the content elements of the message. PCRN 136 may then infer a message type from the content elements using a set of inference rules. Finally, PCRN 136 may respond to the message appropriately according to the message type.

According to various exemplary embodiments, PCRN 136 may receive requests to allocate resources from AF 150, SGW 132, and/or POW 134. PCRN 136 may allocate resources by generating appropriate PCC and QoS rules and send them to PGW 134 and SGW 132. Once PCC and QoS rules are installed in the PGW 134 and SGW 132 respectively, these components may be responsible for monitoring network connections. When an event occurs which, for example, may affect bearer state, the PGW 134 or SGW 132 may report the event to the PCRN 136 using a CCR 170. For example, if the SGW 132 detects an error in installing a new QoS rule or allocating a new bearer, SGW 132 may send CCR 170 to the PCRN 136 providing details of the event. Events may not be limited to errors and may include any event for which PCRN 136 previously provisioned an event trigger to SGW 132 or PGW 134 and any event which does not require an event trigger.

Packet data network 140 may be any network for providing data communications between user equipment 110 and other devices connected to packet data network 140, such as AF 150. Further, packet data network 140 may provide, for example, phone and/or Internet service to various user devices in communication with packet data network 140.

Application function (AF) 150 may be a device that provides an application service to user equipment 110. Thus, AF 150 may be a server or other device that provides, for example, streaming video service to user equipment 110. AF 150 may further be in communication with the PCRN 136 of the EPC 130 via an Rx interface. When AF 150 is to begin providing application service to user equipment 110, AF 150 may generate an application request message, such as an AA-Request (AAR) 160 according to the Diameter protocol, to notify the PCRN 136 that resources should be allocated for the application service. Such an application request message may include information such as an identification of the subscriber using the application service and an identification of the particular service data flows that must be established in order to provide the requested service. AF 150 may communicate such an application request to the PCRN via the Rx interface 215.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-5. Once PCRN 136 has provisioned PCC and QoS rules for various services over subscriber network 100, SGW 132 may detect an event such as, for example, an out of credit event, for which it has been provisioned with an event trigger. SGW 132 may then construct a CCR message 170 to report the event to PCRN 136. SGW 132 may construct CCR message 170 without an event-trigger AVP indicating that it is reporting an out of credit event, but may include all of the content information necessary to report an out of credit event such as, for example, a Charging-Rule-Report AVP including a Final-Unit-Indication AVP. It may then send the CCR message 170 to PCRN 136.

When PCRN 136 receives CCR message 170, it may attempt to determine the message type of the message. PCRN 136, however, may not be able to directly determine the message type because CCR message 170 does not contain an event-trigger AVP. PCRN 136 may then attempt to infer a message type from the content elements of CCR message 170. PCRN 136 may identify the Charging-Rule-Report AVP and Final-Unit-Indication AVP as content elements of the message. PCRN 136 may then infer that CCR message 170 is an out of credit event message because it contains a Charging-Rule-Report AVP and a Final-Unit-Indication AVP. PCRN 136 may then process CCR message 170 as an out of credit event message.

Figure 2:
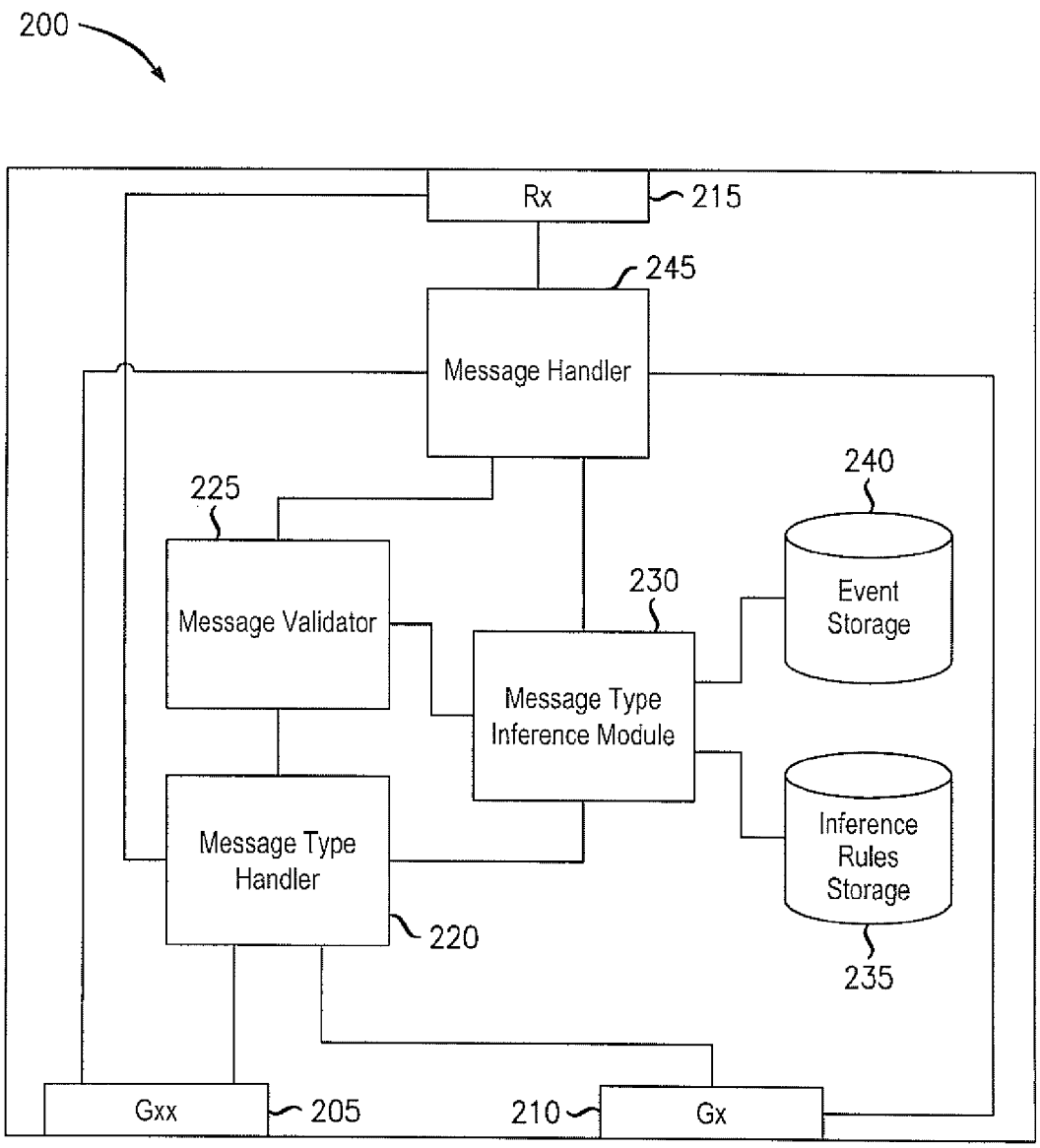
FIG. 2 illustrates an exemplary policy and charging rules node (PCRN) for receiving and processing messages from network components.

FIG. 2 illustrates an exemplary policy and charging rules node (PCRN) for receiving and processing messages from network components. PCRN 200 may correspond to PCRN 136 of exemplary subscriber network 100. PCRN 200 may include Gxx interface 205, Gx interface 210, Rx interface 215, message type handler 220, message validator 225, message type inference module 230, inference rules storage 235, event storage 240 and message handler 245.

Gxx interface 205 may be an interface comprising hardware and/or executable instructions encoded on a machine-readable storage medium configured to communicate with a serving gateway such as SGW 132. Such communication may be implemented according to the 3GPP TS 29.212. For example, Gxx interface 205 may receive event messages and application requests from SGW 132 and send QoS rules to SGW 132. Gxx interface 205 may receive messages from SGW 132 that deviate from the format specified by 3GPP TS 29.212.

Gx interface 210 may be an interface comprising hardware and/or executable instructions encoded on a machine-readable storage medium configured to communicate with a packet data network gateway, such as PGW 134. Such communication may be implemented according to the 3GPP TS 29.212. For example, Gx interface 210 may receive event messages and application requests from PGW 134 and send PCC rules to PGW 134. Gx interface 210 may receive messages from PGW 134 that deviate from the format specified by 3GPP TS 29.212.

Rx interface 215 may be an interface comprising hardware and/or executable instructions encoded on a machine-readable storage medium configured to communicate with an application function such as AF 150. Such communication may be implemented according to the 3GPP TS 29.214. For example, Rx interface 215 may receive application requests from AF 150.

Message type handler 220 may include hardware and/or executable instructions encoded on a machine-readable storage medium configured to determine whether a message includes a message type element. Message type handler 220 may receive messages from Gxx interface 205, Gx interface 210, or any other interface for which PCRN 200 acts as a registrant for messages. Message type handler 220 may compare each element of a received message to a list of known message type elements. The list may include elements that indicate the type of the message such as, for example, an Event-Trigger AVP which indicates the type of event for an event reporting message. If message type handler 220 determines that a message contains a message type element, it may pass the message to message validator 225 for validation. If message type handler 220 determines that a message does not contain a message type element, it may pass the message to message type inference module 230.

Message validator 225 may include hardware and/or executable instructions encoded on a machine-readable storage medium configured to validate the construction of messages based on message type. When message validator 225 receives a message, it may compare the message to a syntax associated with a message type element of the message. If message validator 225 determines that the message is properly constructed, it may pass the message to message handler 245. Alternatively, message validator 225 may pass the message to message type inference module 230 even when the message is properly constructed. Message validator 225 may also determine that a message is not properly constructed because an element is missing. If the missing element is a message type element, message validator 225 may then pass the message to message type inference module 230. In various embodiments, if message validator 225 determines that the message is missing a required content element, PCRN 200 may ignore the message. Alternatively, PCRN 200 may ignore any message that is missing any element.

Message type inference module 230 may include hardware and/or executable instructions encoded on a machine-readable storage medium configured to infer a message type from at least one content element. As will be explained in more detail with regard to FIGS. 3-4, message type inference module 230 may apply a set of inference rules stored in inference rules storage 235 to the content elements of the message to infer a message type for the message. Inference rules storage 235 may contain a configurable list of rules that can be updated to allow different message formats. Message type inference module 230 may also compare content elements of the received message to previously received messages stored in event storage 240 to determine the present state of the content element and determine whether the message is changing a content element. If message type inference module 230 is able to infer a message type for the message, it may pass the message and message type to message handler 245. Alternatively, message type inference module 230 may modify the message to add a message type element and/or may pass the message to message validator 225. If message type inference module 230 is unable to infer a message type, PCRN 200 may ignore the message.

Inference rules storage 235 may be any machine-readable medium capable of storing inference rules for use by message type inference module 230. Accordingly, inference rules storage 235 may include a machine-readable storage medium such as read-only memory (ROM), random-access memory (RAM), magnetic disk storage media, optical storage media, flash-memory devices, and/or similar storage media. As will be described in further detail below with respect to FIG. 4, inference rules storage 235 may store multiple inference rules relating criteria to message type.

Event storage 240 may be any machine-readable medium capable of storing data regarding previously received event messages. Accordingly, event storage 240 may include a machine-readable storage medium, such as read-only memory (ROM), random-access memory (RAM), magnetic disk storage media, optical storage media, flash-memory devices, and/or similar storage media. Event storage may store information regarding previously received event messages using any method known in the art.

Message handler 245 may include hardware and/or executable instructions encoded on a machine-readable storage medium configured to process messages received by the PCRN 200. Message handler 245 may respond to the message based on the message type and the content of the message. For example, message handler 245 may respond to an event report message by updating records related to the event and generating new PCC and/or QoS rules in response to the event report message. Message handler may then transmit these rules over Gxx interface 205, Gx interface 210 and/or Rx Interface 215.

FIG. 3 illustrates an exemplary event reporting message 300. It should be understood that PCRN 136 may receive other types of messages and that an event reporting message is used as an example. PCRN 136 may also receive other types of Diameter messages or messages using different protocols. Event reporting message 300 may be a CCR message constructed according to the Diameter message protocol and/or 3GPP TS 29.212. Accordingly, event reporting message 300 may include a header 310, CC-Request-Type 330, Subscription-Id 340, AN-GW-Address 350, Charging-Rule-Report 360, and a number of additional elements 320, 370. Note that the order of the elements of CCR 300 may vary. Thus, for example, CC-Request-Type 330 may be located after AN-GW-Address 340 or Rule-Report 360. In various embodiments, the message may be missing one or more elements required by a relevant specification, making that element a missing element. For example, event reporting message 300 contains no Event-Trigger element as normally required by 3GPP TS 29.212, so an Event-Trigger element may be described as a missing element.

Header 310 may be a standard Diameter header indicating that message 300 is a CCR. Thus, header 310 may include a command code field set to a value of 272 and the R-bit field of the command flags field set, as provided for by the Diameter protocol and 3GPP TS 29.212.

CC-Request-Type 330 may be an attribute value pair (AVP) for indicating the type of the CCR message. For example, CC-Request-Type field 330 indicates that the CCR message is an update message as indicated by the UPDATE enumerated value. Because CC-Request-Type 330 indicates a message type, the data in the field may be considered a message type element.

Subscription ID 330 may be an attribute-value pair (AVP) for indicating the subscriber that is associated with a particular event message. For example, subscription ID 330 indicates that the subscription identified as "012345678901234" is associated with event reporting message 300. This information may be used to identify the particular phone or user affected by the event.

AN-GW-Address 350 may be an AVP for indicating the SGW that is associated with a particular event message. AN-GW-Address 350 may store an IPv4, IPv6 address, or any other identifier known in the art of identifying a network device. For example, AN-GW-Address 340 indicates that the SGW identified as "215.124.27.81" is associated with the event. AN-GW-Address 340 may be considered a content element. The presence of AN-GW-Address 340 in the message may indicate that the SGW has changed. Thus, message type inference module 230 may infer that the message type is an AN_GW_CHANGE event. In various embodiments, message type inference module may compare the AN-GW-Address 340 with previous events in event storage 240 to determine whether "0x7374" is different from previous values.

Charging-Rule-Report 360 may be an AVP for indicating changes to a PCC and/or QoS rule in response to an event. Charging-Rule-Report field 360 may contain sub-elements such as Charging-Rule-Name 363, PCC-Rule-Status 366, Bearer-Identifier 369, Rule-Failure Code (not shown), and Final-Unit-Indication field (not shown). Charging-Rule-Report 360 may be considered a content element. The presence of Charging-Rule-Report 360 in the message may indicate that one or more of several possible events has occurred. Thus, message type inference module 230 may analyze the sub-elements of Charging-Rule-Report 360 and compare the message to previous messages stored in Event Storage 240 before it infers a message type. For example, the sub-element PCC-Rule-Status 366 has a value of TEMPORARILY INACTIVE. Therefore, message type inference module 230 may infer that the message type is a LOSS_OF_BEARER because a PCC rule becomes TEMPORARILY INACTIVE when the bearer is lost.

FIG. 4 illustrates an exemplary data arrangement 400 for storing inference rules. Data arrangement 400 may be, for example, a table in a database stored in inference rules storage 235, event storage 240 or another internal or external memory. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include rule ID field 405, criteria field 410 and result field 415. Data arrangement 400 may include additional fields (not shown) required or useful in defining inference rules. Data arrangement 400 may include multiple entries such as, for example, entries 420, 425, 430, 435, 440, 445, and 450 and 455.

Rule ID field 405 may be used to uniquely identify each inference rule. Criteria field 410 may be used to store criteria which may be compared to each message. The criteria may be in the form of a Boolean expression that message type inference module 230 may evaluate for a received message. The criteria may also be executable instructions that message type inference module may execute to evaluate a received message. Result field 415 may be used to store the result if a message satisfies the criteria of criteria field 410. The result may be a value for a message type.

As an example, record 420 indicates an inference rule identified by rule ID "1." The criteria require that the received message contains a 3GPP-SGSN-Address AVP or a 3GPP-SGSN-IPv8-Address AVP. If a received message meets these criteria, the message type inference module may infer the result that the message type is a SGSN_CHANGE event.

As an example, record 425 indicates an inference rule identified by rule ID "2." The criteria require that the received message contains a Final-Unit-Indication AVP. If a received message meets these criteria, the message type inference module may infer the result that the message type is an OUT_OF_CREDIT event.

As an example, record 430 indicates an inference rule identified by rule ID "3." The criteria require that the received message contains a Charging-Rules-Report AVP and that the Event Storage contains an OUT_OF_CREDIT event for the PCC rule indicated by the Charging-Rules-Report AVP. If a received message meets these criteria, the message type inference module may infer the result that the message type is a REALLOCATION_OF_CREDIT event.

As an example, record 435 indicates an inference rule identified by rule ID "4." The criteria require that the received message contains a PCC-Rule-Status AVP with a value of TEMPORARILY_INACTIVE. If a received message meets these criteria, the message type inference module may infer the result that the message type is a LOSS_OF_BEARER event.

As an example, record 440 indicates an inference rule identified by rule ID "5." The criteria require that the received message contains a PCC-Rule-Status AVP with a value of ACTIVE. If a received message meets these criteria, the message type inference module may infer the result that the message type is a RECOVERY_OF_BEARER event.

Record 450 indicates a default inference rule identified by rule ID "99." There may be any number of inference rules in data arrangement 400, and a default inference rule may be located anywhere in data arrangement 400. Rule ID "99" is only an example of one possible location. If a message does not satisfy the criteria for any other inference rules, the message may satisfy the default rule because it has no criteria. Record 450 indicates that the result of satisfying the default rule is that the message is invalid. PCRN 200 may ignore invalid messages.

Figure 5:
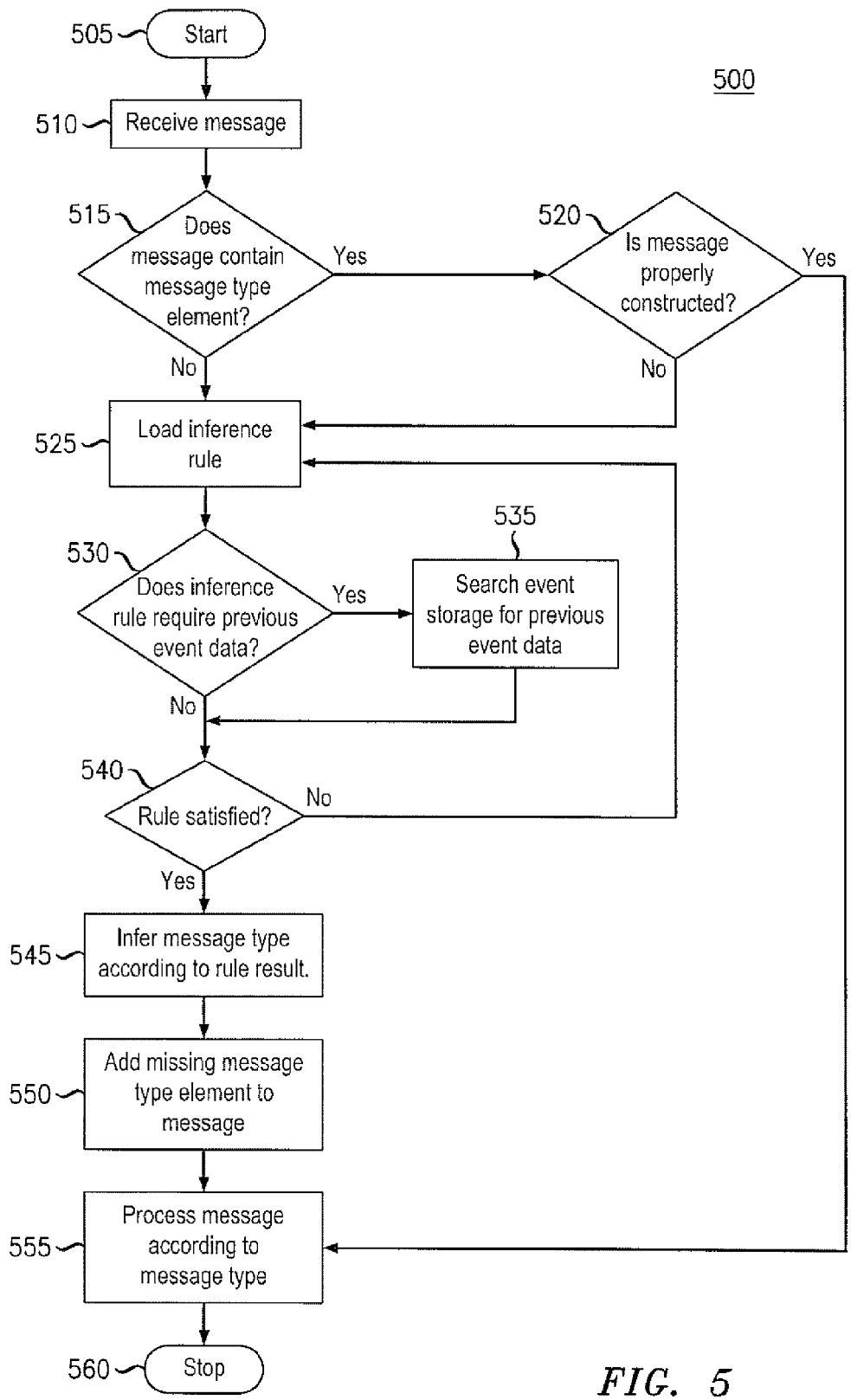
FIG. 5 illustrates an exemplary method for interpreting a received event message.

FIG. 5 illustrates an exemplary method 500 for interpreting a received event message 300. The method is also applicable to other types of messages such as, for example, AAR messages. Method 500 may be performed by the components of PCRN 136 and/or PCRN 200 to interpret and respond to event messages sent by SGW 132 or PGW 134.

Method 500 may begin at step 505 and proceed to step 510 where PCRN 200 may receive an event message via Gxx interface 205 or Gx interface 210. In the case of an AAR message, PRCN 200 may receive the message via Rx interface 215. Method 500 may then proceed to step 515 where message type handler 220 may determine whether the message contains at least one message type element. Message type handler 220 may compare each element of the message with a list of known message type elements. If the message contains a message type element, message type handler may pass the message to message validator 520, and method 500 may proceed to step 520. Otherwise, method 500 may pass the message to message type inference module 230 and proceed directly to step 525.

In step 520, message validator 225 may determine whether the message is properly constructed. Message validator 225 may compare the message with a syntax associated with the message type element. If the message matches the syntax, message validator 225 may determine that the message is properly constructed and proceed to step 555. Alternatively, method 500 may proceed to step 525 regardless. If the message validator 225 determines that a message type element is missing, the method may proceed to step 525. In various embodiments, if the message does not match the syntax, message validator 225 may cause PCRN 200 to ignore the message.

In step 525, message type inference module 230 may load an inference rule from inference rules storage 235. The message type inference module 235 may load the rule in data structure 235 with the lowest rule ID the first time method 500 reaches step 525 and load rules with higher rule IDs each time the method reaches step 525. The method 500 may then proceed to step 530.

In step 530, message type inference module may determine whether the loaded inference rule requires previous event data. For example, the criteria may require a previous OUT_OF_CREDIT event related to the Charging-Rule-Name element of the message. If the criteria contain a reference to previous event data, method 500 may proceed to step 535. In step 535, the message type inference module may search the data in event storage 240 for the referenced data. The method may then proceed to step 540.

In step 540, the method may determine whether the rule is satisfied. A rule may be satisfied if the message content elements and the event data meet the rule criteria. If the rule is not satisfied, the method may return to step 525 and load the next inference rule in inference rules storage 235. If the rule is satisfied, the method may proceed to step 545.

In step 545, message type inference module 230 may infer the message type from the result 415 of the satisfied inference rule. The result 415 may indicate the message type of the message. Once message type inference module 230 has inferred a message type, method 500 may proceed to step 550. In step 550, message inference module 230 may add a message type element corresponding to the inferred message type to the received message. Message type inference module 230 may also add the complete message to event storage 240. Then, message type inference module 230 may pass the message to message handler 245 and the method may proceed to step 555.

In step 555, message handler 245 may process the message according to the message type. The processing may involve generating or modifying PCC or QoS rules, transmitting rules to other network components, updating internal data or any other function performed by the PCRN. Method 500 may then proceed to step 560 where it stops.

Having described exemplary components and methods for the operation of exemplary subscriber network 100 and PCRN 200, an example of the operation of exemplary network 100 and PCRN 200 will now be provided with reference to FIGS. 1-4. PCRN 136 may correspond to PCRN 200. CCR 170 may correspond to event message 300. Data structure 400 may describe the contents of inference rule storage 235.

The process may begin when PCRN 136, 200 receives a message 170, 300 from SGW 132 over Gxx interface 205. Message type handler 220 may begin interpreting event message 300 by determining whether event message 300 contains any message type elements. Event message 300 contains a CC-Request-Type AVP. Therefore, message type handler 220 may pass the message to message validator 225. Alternatively, message type handler 220 may only consider Event- Trigger to constitute a message type element. Message validator 225 may then compare a syntax for UPDATE messages with message 300. Message validator 225 may determine that message 300 is not properly constructed because it is missing an Event-Trigger element. Message validator 225 may then pass message 300 to message type inference module 235, and the method may proceed to step 525.

Message type inference module 235 may then load the first inference rule from inference rules storage 235, 400. The method then proceeds to step 530. Record 420 containing rule "1" does not contain criteria requiring previous event data, so the method may proceed to step 540. CCR 170 does not contain either a 3GPP-SGSN-Address AVP or a 3GPP-SGSN-IPv6-Address AVP, so the method may return to step 525 and load the next inference rule. The method may proceed through steps 525, 530 and 540 for rules "2" 425 and "3" 430 in a similar manner because CCR does not contain the required AVPs for those rules.

When the method reaches step 540 for record 435 containing rule "4" 435, the message type inference module may determine that CCR 170 satisfies the rule because the PCC-Rule-Status AVP equals "TEMPORARILY_INACTIVE." The method may then proceed to step 545 where message type inference module 230 may infer that CCR 170 is a LOSS_OF_BEARER message according to the result 415 of record 435. In step 550, message type inference module 230 may add an Event-Trigger AVP with a value of LOSS_OF_BEARER to CCR 170. Message type inference module 230 may also add the LOSS_OF_BEARER event to event storage 240. Message type inference module 230 may then pass CCR 170 to message handler 245.

According to the foregoing, various exemplary embodiments provide for processing messages received at a PCRN. In particular, by inferring a message type from the types and values of content elements, a PCRN may process incomplete messages, increasing interoperability with varying network components.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for processing messages, the method comprising:
   receiving an incomplete control message at the PCRN, the message comprising at least one content element, wherein the incomplete control message is missing an element that indicates the type of the message;
   inferring a message type of the incomplete control message based on the at least one content element; and
   responding to the incomplete control message based on the message type of the message and the at least one content element of the message.

2. The method of claim 1, further comprising:
   inferring a value of at least one missing element of the incomplete message based on the at least one content element.

3. The method of claim 2, wherein the incomplete message is a credit control request (CCR) message and the missing element is an Event-Trigger Attribute Value Pair (AVP).

4. The method of claim 1, wherein the message further comprises a message type element and the method further comprises:
   determining that the message is properly constructed according to a syntax associated with a value of the message type element.

5. The method of claim 4, wherein the message is a credit control request (CCR) message and the message type element is an Event-Trigger Attribute Value Pair (AVP).

6. The method of claim 1, wherein the step of inferring a message type further comprises determining that a received message satisfies the criteria of an inference rule.

7. The method of claim 1, wherein the step of inferring a message type further comprises:
   searching a history of previously received messages; and
   inferring a message type of the message at least partially from a previously received message.

8. A policy and charging rules node (PCRN) for processing messages, the PCRN comprising:
   an interface that receives at least one incomplete event reporting message, the message comprising at least one content element, wherein the event reporting message is missing an element that indicates the type of the message;
   an inference rules storage that contains a set of inference rules;
   a message type inference module that infers a message type from the at least one content element and the method further comprises:
   determining that the message is properly constructed according to a syntax associated with a value of the message type element.

9. The PCRN of claim 8, further comprising:
   a message type handler that determines whether a message contains a message type element; and
   a message validator that determines whether a message is properly constructed according to a syntax associated with a message type element.

10. The PCRN of claim 8, further comprising:
    an event storage that contains data regarding previous event messages,
    wherein the message type inference module infers a message type based at least partially on the data regarding previous event messages.

11. The PCRN of claim 8 wherein the interface comprises at least one of a Gx interface and a Gxx interface.

12. A non-transitory machine-readable storage medium encoded with instructions for a Policy and Charging Rules Node (PCRN) to process incoming messages based on at least one content element, the machine-readable storage medium comprising:
- instructions for receiving an incomplete Diameter message at the PCRN, the incomplete Diameter message comprising at least one content element, wherein the incomplete Diameter message is missing an element that indicates the type of the message;
- instructions for identifying a content element type for each of the at least one content element of the incomplete message;
- instructions for inferring a message type of the incomplete Diameter message based on at least one content element type of the at least one content element; and
- instructions for responding to the incomplete Diameter message based on the message type of the message and the at least one content element of the incomplete Diameter message.

13. The non-transitory machine-readable storage medium of claim 12, further comprising:
- instructions for inferring a value of at least one missing element of the incomplete message based on at least one content element type of the at least one content element.

14. The non-transitory machine-readable storage medium of claim 13, wherein the incomplete Diameter message is a credit control request (CCR) message and the missing element is an Event-Trigger Attribute Value Pair (AVP).

15. The non-transitory machine-readable storage medium of claim 12, wherein the message further comprises a message type element and the machine-readable storage medium further comprises:
- instructions for ensuring that the message is properly constructed according to a syntax associated with a value of the message type element.

16. The non-transitory machine-readable storage medium of claim 12, wherein the message is a credit control request (CCR) message and the message type element is an Event-Trigger Attribute Value Pair (AVP).

17. The non-transitory machine-readable storage medium of claim 12, wherein the instructions for inferring a message type further comprise:
- instructions for determining a value of a content element;
- instructions for inferring a message type of the message based on the value of the content element.

18. The non-transitory machine-readable storage medium of claim 12, wherein the instructions for inferring a message type further comprise:
- instructions for identifying a type of a sub-element of the at least one content element;
- instructions for determining a value of the sub-element; and
- instructions for inferring a message type of the message at least partially from the value of the sub-element.

* * * * *